United States Patent [19]
Cohen et al.

[11] Patent Number: 5,317,673
[45] Date of Patent: May 31, 1994

[54] METHOD AND APPARATUS FOR CONTEXT-DEPENDENT ESTIMATION OF MULTIPLE PROBABILITY DISTRIBUTIONS OF PHONETIC CLASSES WITH MULTILAYER PERCEPTRONS IN A SPEECH RECOGNITION SYSTEM

[75] Inventors: Michael H. Cohen, Burlingame; Horacio E. Franco, Menlo Park, both of Calif.

[73] Assignee: SRI International, Menlo Park, Calif.

[21] Appl. No.: 901,716

[22] Filed: Jun. 22, 1992

[51] Int. Cl.$^5$ .............................................. G10L 5/06
[52] U.S. Cl. ................................. 395/2.41; 381/41; 381/42
[58] Field of Search .................... 381/42, 41; 395/2.41

[56] References Cited
U.S. PATENT DOCUMENTS
5,175,793 12/1992 Sakamoto et al. ...................... 395/2
5,228,087 7/1993 Bickerton .............................. 381/43

OTHER PUBLICATIONS
Rabiner et al., "An Introduction to Hidden Markov Models," *IEEE ASSP Magazine*, Jan. 1986, pp. 4-16.
Richard P. Lippmann, entitled "An Introduction to Computing with Neural Nets," *IEEE ASSP Magazine*, Apr. 1987, pp. 4-23.
Paper entitled "Links between Markov Models and Multi-layer Perceptrons," *IEEE Trans. on Pattern Analysis and Machine Intelligence*, vol. 12, pp. 1167-1178, Dec. 1990.
Bourlard et al., "CDNN: A Context Dependent Neural Network For Continuous Speech Recognition," *Proc. of International Conference on Acoustics, Speech and Signal Processing 92*, published Mar. 1992.

*Primary Examiner*—Allen R. MacDonald
*Assistant Examiner*—Richard J. Kim
*Attorney, Agent, or Firm*—Townsend & Townsend Khourie & Crew

[57] ABSTRACT

In a hidden Markov model-based speech recognition system, multilayer perceptrons (MLPs) are used in context-dependent estimation of a plurality of state-dependent observation probability distributions of phonetic classes. Estimation is obtained by the Bayesian factorization of the observation likelihood in terms of posterior probabilities of phone classes assuming the context and the input speech vector. The context-dependent estimation is employed as the state-dependent observation probabilities needed as parameter input to a hidden Markov model speech processor to identify the word sequence representing the unknown speech input of input speech vectors. Within the speech processor, models are provided which employ the observation probabilities in the recognition process. The number of context-dependent nets is reduced to a single net by sharing the units of the input layer and the hidden layer and the weights connecting them in the multilayer perceptron while providing one output layer for each relevant context. Each output layer is trained as an independent network on the specific examples of the corresponding context it represents. Training may be optimized at an intermediate set of weights between the context-independent-associated weights and the context-dependent associated weights to which training would normally converge.

20 Claims, 5 Drawing Sheets

METHOD AND APPARATUS FOR CONTEXT-DEPENDENT ESTIMATION OF MULTIPLE PROBABILITY DISTRIBUTIONS OF PHONETIC CLASSES WITH MULTILAYER PERCEPTRONS IN A SPEECH RECOGNITION SYSTEM

ACKNOWLEDGEMENT OF SPONSORSHIP

This invention was partially funded under a grant from the Defense Advanced Research Projects Agency (DARPA) under Contract No. MDA 904-90-C-5253, in addition to funding from SRI International of Menlo Park, Calif. SRI International retains ownership rights.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

This invention relates to speech recognition and more particularly to the types of such systems based on a hybrid combining hidden Markov models and multilayer perceptrons (HMMs and MLPs).

By way of background, an instructive tutorial on hidden Markov modeling processes is found in a 1986 paper by Rabiner et al., "An Introduction to Hidden Markov Models," *IEEE ASSP Magazine*, January, 1986, pp. 4-16. A tutorial treatment on neural networks, including multilayer perceptron-type neural networks, is found in a paper by Richard P. Lippmann, entitled "An Introduction to Computing with Neural Nets," *IEEE ASSP Magazine*, April, 1987, pp. 4-23.

Various hidden-Markov-model-based speech recognition systems are known and need not be detailed herein. Such systems typically use realizations of phonemes which are statistical models of phonetic segments (including allophones or, more generically, phones) having parameters that are estimated from a set of training examples.

Models of words are made by concatenating appropriate phone models, a phone being an acoustic realization of a phoneme, a phoneme being the minimum unit of speech capable of use in distinguishing words. Recognition consists of finding the most-likely path through the set of word models for the input speech signal.

Known hidden Markov model speech recognition systems are based on a model of speech production as a Markov source. The speech units being modeled are represented by finite state machines. Probability distributions are associated with the transitions leaving each node, specifying the probability of taking each transition when visiting the node. A probability distribution over output symbols is associated with each node. The transition probability distributions implicitly model duration. The output symbol distributions are typically used to model speech characteristics such as spectra.

The probability distributions for transitions and output symbols are estimated using labeled examples of speech. Recognition consists of determining the path through the Markov chain that has the highest probability of generating the observed sequence. For continuous speech, this path will correspond to a sequence of word models.

The specific hidden Markov model recognition system employed in conjunction with the present invention is the Decipher speech recognizer, which is available from SRI International of Menlo Park, Calif. The Decipher system incorporates probabilistic phonological information, a trainer capable of training phonetic models with different levels of context dependence, multiple pronunciations for words, and a recognizer. The recognizer can process speaker-independent continuous speech input by dealing with specific models developed through training.

Speech recognition using multilayer perceptrons as a source of the state-dependent observation likelihoods in a hidden Markov model has recently been proposed. A multilayer perceptron is a specific type of a neural network composed of simple processing elements which in this context is limited to those which compute a dot product of incoming activations and weights, plus a bias term, the result of which is mapped through a differentiable sigmoid nonlinearity. The hybridization of HMMs with MLPs was first suggested by groups led by Herve' Bourlard in papers entitled "Links between Markov Models and Multi-layer Perceptrons," *Advances in Neural Information Processing Systems*, Vol. 2, pp. 502-510, 1989 (Morgan Kaufman, San Mateo, Calif.), (later reported in *IEEE Trans. on Pattern Analysis and Machine Intelligence*, Vol. 12, pp. 1167-1178, December, 1990). Using the suggestions of Bourlard et al., the present inventors have built and verified that multi-layer perceptrons can be used in hybrid hidden Markov model/neural network speech recognition systems, and the inventors have identified areas of needed improvement in the state of the art of fully computerized speech recognition systems.

The hybrid HMM/MLP-based context-independent approaches have heretofore not been successfully extended to estimate context-dependent probabilities of phonetic classes of speech information. One context-dependent HMM/MLP approach has also been suggested, but it remains unproven. (Bourlard et al., "CDNN: A Context Dependent Neural Network For Continuous Speech Recognition," *Proc. of International Conference on Acoustics, Speech and Signal Processing* 92, published March, 1992.)

Context-dependent modeling has been difficult with previous MLPs due to a great increase in the number of parameters resulting from a straight-forward extension of the simpler context-independent approach. Moreover, the inherent discriminative nature of conventional MLP training algorithms appears to make it difficult to model phonetic classes with multiple distributions as in a conventional HMM speech recognition processor.

What is needed is a practical context-dependent hybrid HMM/MLP approach to the speech recognition problem.

SUMMARY OF THE INVENTION

According to the invention, in a hidden Markov model-based speech recognition system, a specific method and apparatus are provided for use of multilayer perceptrons (MLPs) in context-dependent estimation of a plurality of state-dependent observation probability distributions of phonetic classes. (The terms "phonetic class" and "phone class" as used herein are interchangeable.) Context-dependent estimation values are obtained by using the Bayesian factorization of the observation likelihood in terms of posterior probabilities of phone classes, assuming the context and the input speech vector. The context-dependent estimation values are employed as the state-dependent observation probabilities needed as parameter input to a hidden Markov model speech processor, such as the Decipher speech processor, to identify the word sequence representing the unknown speech input as input speech vectors. Specifically, a multiple-output-layer multilayer perceptron-type neural network is uniquely equipped to compute one of the factors of Bayesian factorization expressed in terms of posterior probabilities. Within the speech processor, models are provided which employ the observation probabilities in the recognition process. While normally requiring a plurality of context-specific nets, which are difficult to train with a limited amount of data, the number of nets is reduced to a single net by sharing the units of the input layer and the hidden layer and the weights connecting them while providing one output layer for each relevant context.

The neural network may be trained reliably by initializing each set of context-specific hidden-to-output-layer weights of the corresponding isomorphic context-independent layer. Each output layer is trained as an independent network on the specific examples of the corresponding context it represents. In a specific embodiment, training is optimized, by using a cross-validation set, at an intermediate set of weights between the context-independent-associated weights and the context-dependent-associated weights to which training would normally converge. Additionally, separate MLP output layers corresponding to the different states of HMM phone models are created and trained and used during recognition in order to allow discriminative training between phones without discriminative training between HMM states of a single phone.

The invention will be better understood by reference to the following detailed description in connection with the accompanying drawings.

DETAILED DESCRIPTION OF SPECIFIC EMBODIMENTS

Figure 1:
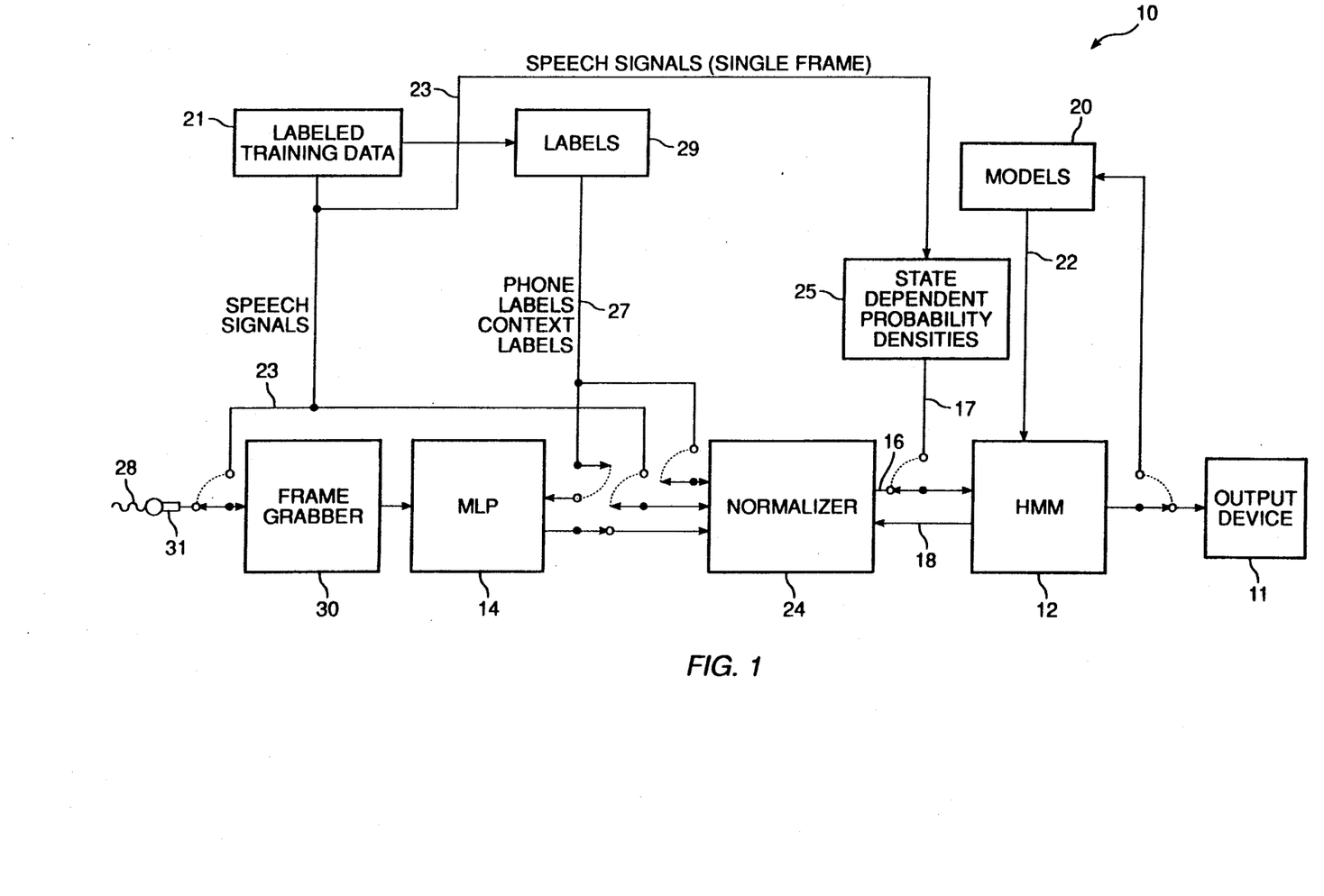
FIG. 1 is a block diagram of a speech recognition processor according to the invention.

FIG. 1 is a speech recognition processor 10 according to the invention. The processor 10 is a hybrid structure which includes a context-dependent hidden Markov model (HMM) speech recognizer 12 as described elsewhere and a context-dependent multilayer perceptron (MLP) 14 according to the invention coupled through a normalizer 24 to the HMM speech recognizer 12. A context-dependent hidden Markov model speech recognition system is a processing system which uses different probability distributions for every phone in every relevant speech class. The context-dependent hidden Markov model used herein expects, as input, the values of scaled state-dependent observation probabilities (likelihoods) in a sequence from an MLP, and as model parameters, state probabilities, interstate transition probabilities and network topology, to produce as output to an output device 11 an estimate of the state sequence, which has associated with it a sequence of words. The MLP 14 receives as input the speech vectors associated with the input utterance.

A known HMM speech processor, such as Decipher developed by SRI International of Menlo Park, California, normally receives as input speech vectors and uses them to determine probability from a preprogrammed set of probability distributions. In this invention, however, the HMM uses probability estimates computed with an MLP-type neural network, the output of which is converted from posterior probabilities of phone classes to observation probabilities, for example, by the normalizer 24. Thus, standard state-dependent probability densities are not needed in normal speech recognition processing in an HMM of the present invention.

Input state-dependent observation probabilities (on signal path 16) are retrieved upon specific request of the HMM 12 via signal path 18. For every state, these are the observation probabilities of the HMM.

As part of the initialization and training of the HMM, word model parameters, including HMM topology and transition probabilities from a source of models 20, are provided (via a signal path 22) to the HMM 12. Also as part of initialization and training, a sequence of training data for single frames is provided from a source of labeled training data 21 via signal path 23 to the conventional HMM state-dependent probability densities 25, which then produces the initial observation probabilities of the HMM via signal path 17. Thereafter, the HMM 12 can act on MLP-processed data.

Further, initialization and training is required for the MLP 14. To this end, the speech signals via signal path 23 are provided to a signal input of a frame grabber 30 which then initializes the input layer of the MLP 14. Corresponding phone labels and context labels are provided via signal path 27 from a source of labels 29 for use to select the output layer of the MLP 14 used during training of the current frame.

Still further, the normalizer 24 must be trained. Thus, speech signals and phone labels from elements 21 and 29 are provided to the normalizer 24 via signal paths 23 and 27, as hereinafter explained.

The output of the speech recognizer 10 is a best estimate of a sequence of words from computations based on phones in the context of words which are in the context of a grammar. The input to the system is raw, unprocessed speech 28, and the initial input device is a cepstral processor 31. The observations of the unprocessed speech are converted by the cepstral processor 31 to the form of spectral-derived time-dependent speech features in a vector. A sequence of these vectors is captured by the frame grabbing means 30.

In a specific embodiment, the MLP 14 receives 234 inputs at a single 234-unit input layer, more specifically, input of nine frames of twenty-six features characterizing cepstra, delta cepstra, energy and delta energy, all of which are normalized to zero mean and unit variance.

Figure 2:
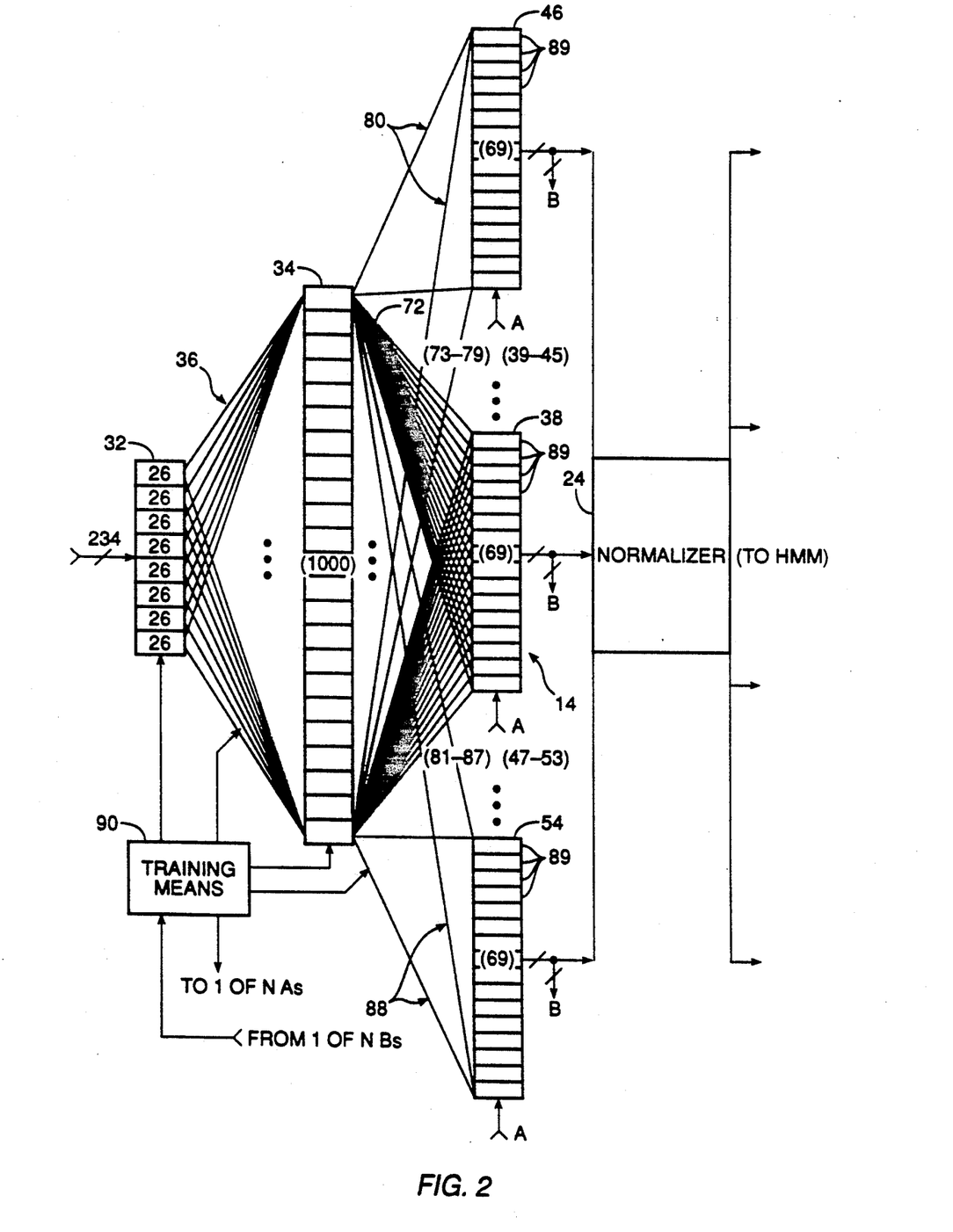
FIG. 2 is a block diagram of an MLP-type neural network and a normalizer according to the invention.

According to the invention, and referring to FIG. 2, the MLP 14 comprises a neural network. A neural network, as used herein to refer specifically to a layered feed-forward neural network, comprises layers of units interconnected by weighted connections for every unit in which every unit in one layer is connected to every unit in a source or previous layer. A neural network according to the invention has a single input layer 32 for receiving a plurality of input speech vectors, a single hidden layer 34, a single set of weights 36 between each unit of the input layer 32 and each unit of the hidden layer 34, and a plurality of output layers 38, 39-46, and 47-54 with an associated plurality of sets of weights 72, 73-80, and 81-88, between each unit of the output layers 38, 39-46 and 48-54 and each unit of the hidden layer 34. Each one of said output layers has a plurality of output units 89 for storing a plurality of probability values for a corresponding number of phone models. The device further includes means 72-88 for forward propagating the features of each input speech vector through the layers to produce which is called an activation level at the output layer, which level is representative of a probability value at each output unit within each one of said output layers 38-55.

In a specific embodiment, the forward propagating means is a signal connection from every unit in one layer to every other unit in a previous layer. Every such connection has an associated weight. The operation performed by every unit is as follows: The sum of products of the activation of every input and the weight of the respective connection is computed for all connections to that unit, then a unit-specific bias term is added, and the value of the biased sum of each unit is processed (mapped) by a sigmoid nonlinearity, the output range of the nonlinearity in this instance varying between zero and one. The resultant value is available to the next layer as an activation value. The mathematical expression for this operation is given by:

$$net_j = \sum_i o_i w_{ji} + bias_j, \text{ and}$$

$$o_j = 1/(1 + \exp(net_j))$$

where $o_i$ is the output or value of the activation of the $i^{th}$ unit of the previous layer, $w_{ji}$ is the weight of the connection between the $i^{th}$ unit of the previous layer and the $j^{th}$ unit of the current layer, $bias_j$ is a bias term for the unit j (seldom explicitly noted in graphical representations), $net_j$ is the pre-sigmoidal-processed activation value, and $o_j$ is the activation value of the $j_{th}$ output of the current layer after processing by the sigmoid.

This is a complete description of one unit of a generalized neural network. The training process is merely the adjusting of the weights and biases in order to achieve some criterion, such as minimum of, for example mean-squared, error or relative entropy E.

The structure of a specific embodiment of a neural net according to the invention comprises 234 units segmented into nine sets (corresponding to nine speech frames) of twenty-six units each, one for each feature component of an input speech vector, forming an input layer, a hidden layer 34 of 1000 units and a set of output layers, each output layer comprising sixty-nine units, corresponding to the number of phone classes in a Decipher-type speech recognizer. According to the invention, each set of sixty-nine output units is connected with the hidden layer as an independent output layer, and each set is trained as an independent output layer associated with a specific context. In contrast to prior art neural nets which had only a context-independent output layer, there are according to the invention three types of output layers: 1) previous phone class context-specific layers (layers 39-46), 2) following phone class context-specific layers (layers 48-54), and 3) a single context-independent phone class layer (layer 38).

Training data and initialization values are provided in the MLP 14 by a training means network needs labeled training examples in connection with a backpropagation mechanism which executes a distributed backpropagation algorithm. The labels include phone identification and context identification. The MLP 14 and its operation are described in greater detail hereinbelow.

Further according to the invention, means 24 coupled to the MLP 14 are provided for determining likelihood of observing each speech vector assuming a specific state of a hidden Markov model. This determining means, referred to herein as a normalizer 24, is operative by factoring, according to Bayes rule, in terms of posterior probabilities of phone classes of the speech vector assuming context and the input speech vector, thereby obtaining values representative of context-dependent estimation, that is, observation probabilities. Since the output of the MLP 14 is in terms of posterior probabilities, and the needed input to an HMM is observation probabilities, this normalizer 24 is an effective interface between the two.

Factoring in the normalizer 24 according to Bayes rule is given by:

$$p(Y|q_j,c_k) = \frac{p(q_j|Y,c_k) * p(Y|c_k)}{p(q_j|c_k)},$$

where $p(Y|c_k)$ can be factored as $$p(Y|c_k) = p(c_k|Y)*p(Y)/p(c_k)$$

where p(Y) is the probability of speech vector Y (which is a term which can be disregarded in the computation, as it will be identical for all recognition paths being compared), $p(c_k)$ is the prior probability of the context class $c_k$ computed by counting in the training set, $p(Y|c_k)$ is the conditional probability of the speech vector Y given context $c_k$, $p(c_k|Y)$ is the conditional probability of the context $c_k$ given the speech vector Y, $p(q_j|Y,c_k)$ is the context-dependent posterior probability of class j, given speech vector Y and context k, $p(Y|q_j,c_k)$ is the observation likelihood of speech vector Y given class $q_j$ and context $c_k$, $p(q_j|c_k)$ is the conditional probability of the class $q_j$ given context $c_k$.

The normalizer 24 is specifically a means for scaling the posterior probabilities of phone classes to convert the activation levels of the output units of the MLP 14 from smoothed context-dependent posterior probabilities to smoothed context-dependent observation likelihoods. The mechanism is a process executed in a computer wherein the scaling is according to the following relationship:

$$p(Y|q_j,c_k) = p(q_j|Y,c_k) * K^k_j.$$

where $K^k_j$ is the scaling factor for class $q_j$ given context $c_k$, $p(q_j|Y,c_k)$ is the context-dependent posterior probability of class $q_j$, given speech vector Y and context $c_k$, and $p(Y|q_j,c_k)$ is the observation likelihood of speech vector Y given class $q_j$ and context $c_k$.

This is merely a weighted average of the scaling factor for converting a pure context-dependent posterior probability to a context-dependent observation likelihood, and the normalizing factor for converting a pure context-independent posterior probability to a context-independent observation likelihood. The weights depend on the number of training examples for every phone class and context.

The scaling factor $K^k_j$ used in this process for scaling from the posterior probabilities to the observation likelihoods is given by:

$$K^k_j = \alpha^k_j / p(q_j) + (1 - \alpha^k_j) * p(c_k|Y)/(p(q_j|c_k)*p(c_k))$$

where:

$$\alpha^k_j = N_{ci}(j)/(N_{ci}(j) + b*(N_{cd}(j,k)))$$

$p(q_j)$ being the prior probability of the phone class $q_j$ computed by counting in the training set, $p(c_k|Y)$ being the posterior probability of context class $c_k$ given the input speech vector Y, $p(q_j|c_k)$ being the conditional probability of phone class $q_j$ given the context $c_k$ computed by counting in the training set, $p(c_k)$ being the prior probability of the context class $c_k$ computed by counting in the training set, $N_{ci}(j)$ being the number of examples of phone class $q_j$, $N_{cd}(j,k)$ being the number of examples of phone class $q_j$ given the context $c_k$, and b being a constant optimized on an independent development set.

In conclusion, the scaling factor is a linear combination of the factors used to convert posterior probabilities to observation likelihoods.

MLP Training Processor

Figure 3:
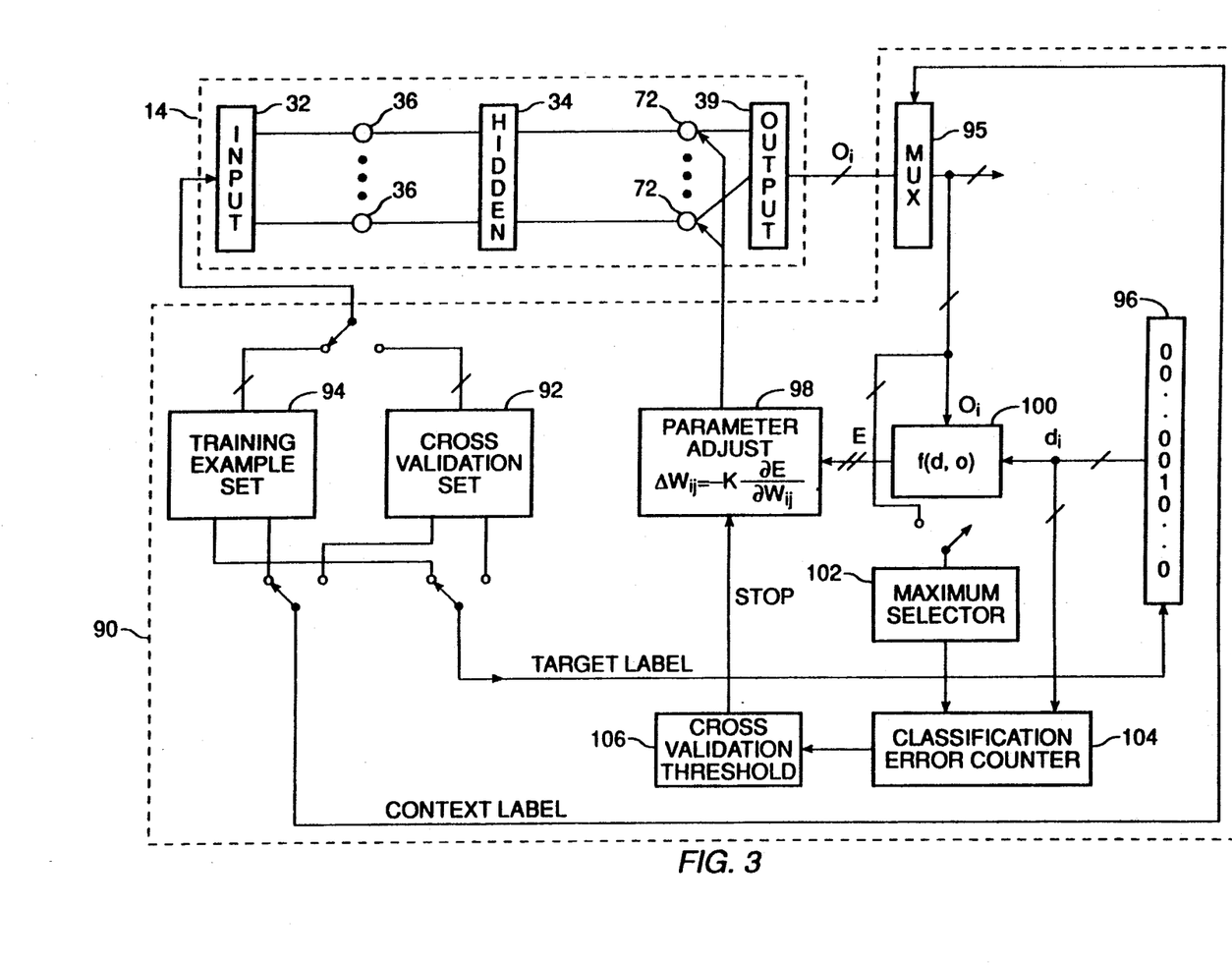
FIG. 3 is a block diagram showing elements of a training processor according to the invention.

Training is a critical element of the invention. Both the hidden Markov model and the MLP must be trained. The training of the hidden Markov model is assumed to be complete for the purpose of this invention and need not be discussed herein. It is sufficient to note that the hidden Markov model is trained with utterances related to scripts or transcriptions of text. It is further assumed that alignment information derived from a previously-trained HMM is supplied for training the MLP. Referring to FIG. 3, there is shown a structure for training one output layer 39 of the context-dependent MLP 14 according to the invention using a training means 90 to optimize weights between layers to smoothed values, said smoothed values being intermediate of context-independent posterior probability distributions and context-dependent posterior probability distributions. The training means 90 uses labeled training data 21, which is a set of vectors corresponding to the utterance with labels for every frame for the phone class and context class to which a frame belongs. It includes a complete training example set 94 for adjusting weights and an independent testing example set called a cross-validation set 92. The cross-validation set 92 is a set used to check the generalization capabilities of whatever is learned from the training example set 94 and is used as an alternative to the training example set 21 in connection with certain tests. The training example set is used for initializing the input layer 32, and associated context label and target label are used to select a single output layer (via a multiplexer 95) and to define a one-of-N target vector corresponding to a particular class of the output layer 39 (using a target vector generator 96, which builds a one-of-N target vector from a target label).

A parameter adjustment means 98 is operative in a given context to first initialize the input-to-hidden layer weights of said multilayer perceptron with input-to-hidden layer weights 36 using weights from a corresponding (isomorphic) context-independent network and to first initialize each set of context specific hidden-to-output layer weights, e.g., 73 with hidden-to-output layer weights from the corresponding context-independent network. Thereafter the parameter adjustment means is used to iteratively change weights as hereinafter explained.

Means are provided for applying what is called the iterative Backpropagation Algorithm with relative entropy criterion, This algorithm is commonly used for neural net training and involves checking the output of the neural net against error criteria and adjusting the weights to reduce the error. Included in this means are the parameter adjustment means 98, which additionally computes changes in weights for each hidden-to-output connection and adjusts accordingly, the means presenting the training examples from a training set 94 to the input layer 32, the paths which forward propagate values representing activations restricting the propagating only to that context-specific output layer 39 corresponding to the context of the input speech vector, that is, the effective multiplexer 95 controlled by the context label, and means for adjusting only those hidden-to-output layer weights corresponding to the context of the input speech vector. The adjusting means is embodied in a relative entropy computation device 100 which inputs relative entropy values E or equivalent values useful for computing the desired parameter adjustments. The forward propagation/back propagation processing is iteratively carried out until a desired minimum error is achieved on the cross-validation training example set 92.

The relative entropy computation device 100 is operative to compute the function:

$$E = f(d,o) = - \sum_{i=1}^{N} (d_i \log o_i + (1 - d_i)\log (1 - o_i))$$

where:

N is the size of the output layer in units, $d_i$ is the $i^{th}$ component of the target, which is either 1 or 0, $o_i$ is the $i^{th}$ output of the output layer obtained after forward propagation to the targeted context, and E is the relative entropy.

Parameter adjustment is made by computing the partial derivatives of the relative entropy criterion with respect to every weight in the target context in the parameter adjuster 98 and then incrementing every weight proportionately to the change in relative entropy multiplied by a negative-signed constant k, called the learning rate.

The parameter adjustment function is given by:

$$\Delta W_{ij} = -k(t_i - o_i)o_j$$

where $\Delta W_{ij}$ is the incremental change in the weight connecting the $j_{th}$ unit in the hidden layer to the $i^{th}$ unit in the output layer, k is the learning rate, t is the target value for the output layer unit i, $o_i$ is the output for the output layer unit i, and $o_j$ is the output for the hidden layer unit j.

Every training iteration consists of two phases: Actual training and cross-validation. Actual training involves parameter adjustment using the Backpropagation Algorithm and the training example set 94. Cross-validation is the use of the alternative cross-validation set 92 to compute output values $o_i$ for the specific context to which the training example belongs. The maximum of the output values is then selected (by a maximum selector 102) and the associated class is then checked against the target label vector 96 to determine if the class of the maximum output value corresponds to the target class. A counter 104 counts the number of accumulated classification errors. The percent decrease in classification error (as obtained by comparing with the next previous cross-validation classification error of the next previous training iteration) is tested against a cross-validation threshold (in element 106) to determine whether a local minimum of the error in classification has been achieved.

Figure 4:
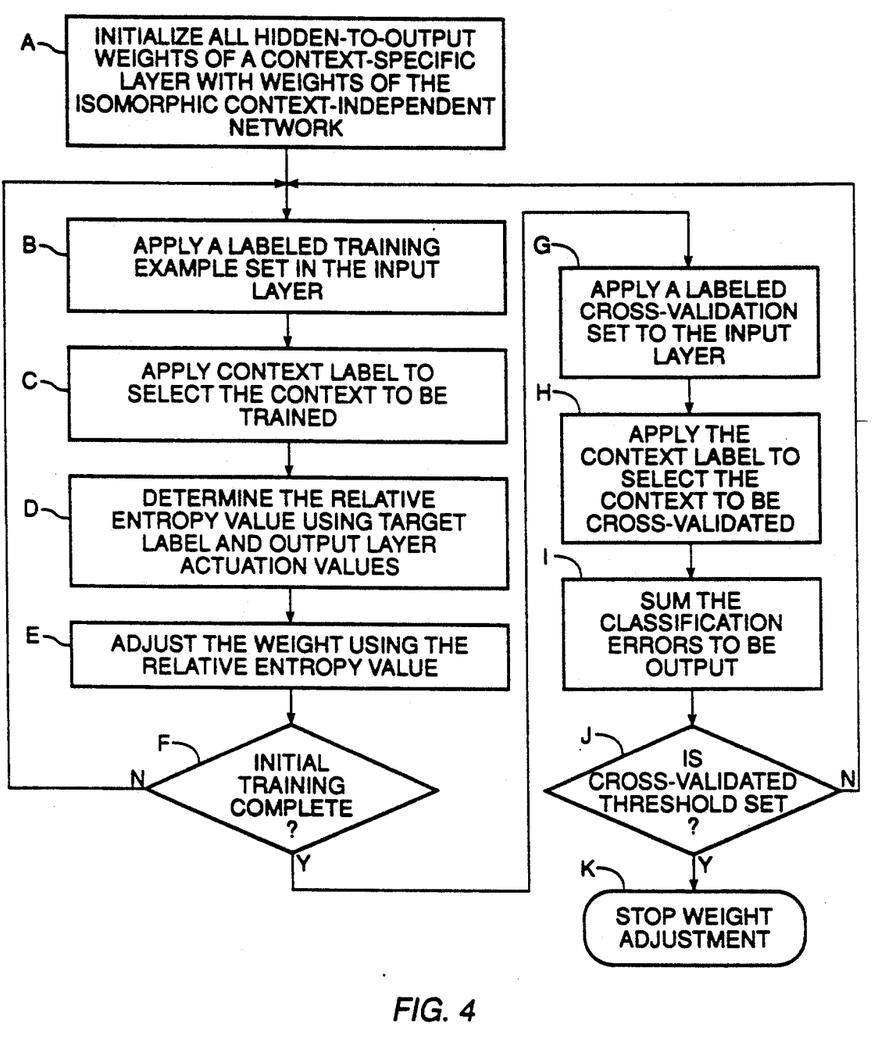
FIG. 4 is a flow chart of the method for training a multiple-output layer context-dependent MLP according to the invention.

FIG. 4 is a flow chart of the training process according to the invention, as previous discussed. All output layers are trainable independently of any other output layer. At the outset all hidden-to-output weights of one selected context-specific layer are initialized with the weight of the corresponding isomorphic context independent network (Step A). Then the labeled training example set is applied to the input layer and forward propagated through the neural net (Step B). Thereupon the context label is applied at the output layer to select the context to be trained (Step C). The output activations and the target label are then used to compute a value representative of the relative entropy (which can be a partial derivative with respect to applied hidden-to-output weights) (Step D). The hidden-to-output weights are then adjusted incrementally using relative entropy as input (Step E). The process is repeated out until training is complete (Step F).

It is then the task according to the invention to cross-validate the results of the training with a different subset of data, called the cross-validation set. The cross-validation set is thereupon applied to the input layer (Step G), and the context label is applied to select the desired context to be cross-validated (Step H). The maximum selector 102 thereupon selects the maximum values of each set of outputs from the output layer 39 and that position is compared with the position of the corresponding target label. The number of errors in classification, i.e., departures from expected maxima, are simply summed up (Step I) and then compared against a cross-validation threshold (Step J). If the cross-validation threshold criteria are met, then the weight adjustment/training procedure is halted (Step K), and the speech recognizer is ready for operation with weights optimized between the context independent initial state and a minimum error point approaching the pure context dependent state. Otherwise, training is resumed with application of the labeled training example set to the input layer, the weights being at other than the initial state (Step B), and the process is repeated (Steps B-J).

Figure 5:
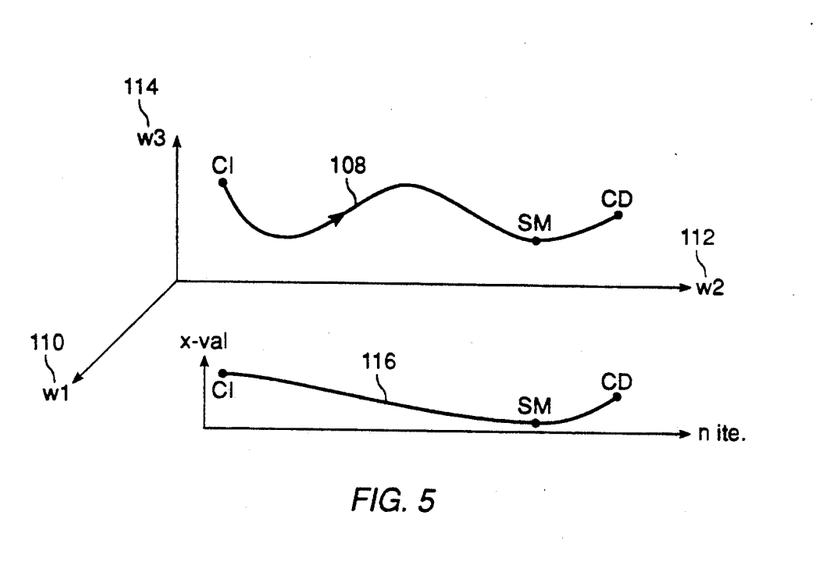
FIG. 5 is a pictorial representation of the learning evolution of the neural network in the parameter space of three representative parameters and associated cross-validation classification whereby cross-validation error is minimized.

FIG. 5 is a pictorial representation resulting from the training illustrated in FIG. 4. It depicts the learning evolution 108 (a trajectory) of a context-specific neural network in the parameter space of three representative weight parameters "W" 110, 112, 114 (of for example 69,000 parameters) in the context-specific neural network and its associated cross-validation classification evolution 116 (a trajectory) showing how cross-validation error (x-val) is minimized at an intermediate point between context-dependent and context-independent parameters. It is to be noted that the trajectories 108, 116 are derived from parameters corresponding to an initially context-independent net toward that corresponding to a context-dependent net. Where the cross-validation threshold tester 106 detects a local minimum (point 118), parameter adjustment and learning is stopped, and the weights corresponding to the minimum cross-validation error are locked into the MLP. The intermediate weights are known as smoothed weights, as indicated by point 120 in the parameter space. The smoothed weights yield a localized minimum error of classification of speech vectors into phonetic classes, in accordance with the invention.

Context-independent weights used for initialization are obtained from a prior known MLP, as for example disclosed in works by Bourlard et al. At initialization of the context-dependent net with the context-independent weights, the net actually computes posterior probability of phone classes given the input data, that is:

$p(q_j|Y)$ is the context-independent posterior probability of class j, given speech vector Y independent of context.

Since only training examples of a specific context are presented to the corresponding context-specific net, the net, assuming enough training examples and enough parameters in the context-specific MLP, and further that the training does not converge to a local minimum, will compute the posterior probability of the phone classes, given the input data and the context. That is:

$p(q_j|Y,c_k)$, the context-dependent posterior probability of class j, given speech vector Y and context k.

As training is stopped before convergence to the asymptotic values of a fully-context-dependent net (by application of the cross-validation set and testing procedures), the net retains useful information about the context-independent initial conditions. Thus, this initialization and training guarantees that classification performance of the context-dependent net with intermediate parameters can never be worse than the performance of a context-independent net, and in most cases will be significantly better.

Figure 6:
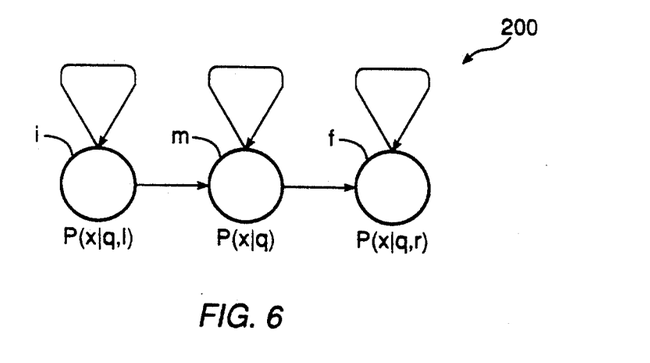
FIG. 6 is a representation of a simple three-state context dependent hidden Markov model for a single phone involving a sequence of differing probability distributions for each state.

FIG. 6 is a depiction of a context-dependent three-state hidden Markov model 200 of a single phone in which a first state i uses a probability distribution which is dependent on a previous phone class, a second state m uses a probability distribution which is context independent, and a third state f uses a probability distribution which is dependent on a next following phone class. This models the coarticulatory effects of the beginning of a phone being more affected by the previous phone and the final part of a phone being more affected by the following phone. This has never been done before with a hybrid MLP/HMM speech recognition system. However, this is a natural consequence of the structure of the invention herein described and the methods according to the invention.

While the invention may be realized in a structure of fixed connections between layers as depicted in accordance with FIG. 1 and FIG. 2, a common implementation is in the form of a set of computer program modules executable on a digital computer, wherein each module performs a specific task. A computer program may also be used to simulate other types of The invention has now been explained with reference to specific embodiments. Other embodiments will be apparent to those of ordinary skill in this art in light of this disclosure. It is therefore not intended that this invention be limited except as indicated by the appended claims.

What is claimed is:

1. In a speech recognition apparatus having a hidden Markov model speech recognizer, a method for using a multilayer perceptron (MLP) for recognizing speech by context-dependent estimation of a plurality of state-dependent observation probability distributions of phonetic (phone) classes which has weights that have been obtained based on a training set of speech vectors, wherein said training set of said speech vectors has been used to create context-dependent phone classes for use in said method, said speech vectors being characterized by phone classes, the method comprising the steps of:

applying input speech vectors containing unknown data to a single input layer of a multilayer perceptron, said multilayer perceptron having a single input layer, a single hidden layer, a single set of weights between said input layer and said hidden layer, and a plurality of output layers with an associated plurality of sets of weights between said hidden layer and said output layers, each one of said output layers having a plurality of output units for storing a plurality of probability values;

forward propagating each input speech vector through said multilayer perceptron to produce an activation level representative of a probability value at each output unit within each one of said output layers;

determining likelihood of observing each said input speech vector, assuming a specific state of a hidden Markov model by factoring, according to Bayes rule, said likelihood of observing being in terms of posterior probabilities of phone classes of the speech vector assuming context and the input speech vector, thereby obtaining values representative of context-dependent estimation; and employing as input to said hidden Markov model speech recognizer said values representative of context-dependent estimation as state-dependent observation probabilities to identify a specific estimated word sequence from said input speech vectors.

2. The method according to claim 1 wherein said determining step is factoring according to Bayes rule given by:

$$p(Y|q_j,c_k) = \frac{p(q_j|Y,c_k) * p(Y|c_k)}{p(q_j|c_k)},$$

where $p(Y|c_k)$ can be factored as $$p(Y|c_k) = p(c_k|Y) * p(Y)/p(c_k)$$

where $p(Y)$ is the probability of speech vector Y (which is a term which can be disregarded in the computation, as it will be identical for all recognition paths being compared), $p(c_k)$ is the prior probability of the context class $c_k$ computed by counting in the training set, $p(Y|c_k)$ is the conditional probability of the speech vector Y given context $c_k$, $p(c_k|Y)$ is the conditional probability of the context $c_k$ given the speech vector Y, $p(q_j|Y,c_k)$ is the context-dependent posterior probability of class j, given speech vector Y and context k, $p(Y|q_j,c_k)$ is the observation likelihood of speech vector Y given class $q_j$ and context $c_k$, $p(q_j|c_k)$ is the conditional probability of the class $q_j$ given context $c_k$.

3. The method according to claim 1 further including training said multilayer perceptron to optimize said weights to smoothed values, said smoothed values being intermediate of context-independent posterior probability distributions and context-dependent posterior probability distributions using a cross-validation set.

4. The method according to claim 3 wherein said training step comprises:

initializing input-to-hidden layer weights of said multilayer perceptron with input-to-hidden layer weights from a corresponding context-independent network;

initializing each set of context specific hidden-to-output layer weights of said multilayer perceptron with hidden-to-output layer weights from a corresponding context-independent network; and applying the iterative Backpropagation Algorithm with relative entropy criterion to said context-dependent network by presenting training examples from a training set to said input layer, while forward propagating values representing activations only to that context-specific output layer corresponding to the context of the input speech vector and backpropagating and adjusting only those hidden-to-output layer weights corresponding to the context of the input speech vector until said cross-validation set indicates a localized minimum error of classification of speech vectors into phonetic classes.

5. The method according to claim 3 wherein states of the hidden Markov model directly correspond to units of separate output layers associated with the separate states of each phone, wherein said employing step further comprises stepping through a sequence for each individual phone while referencing different output layers, said different output layers being organized as a sequence.

6. The method according to claim 5 wherein said separate output layers are trained only with input speech vectors in the training set which are aligned with the corresponding state position within a phone so that a sequence of probabilities can be used to represent a phone and that the training of the MLP can be based on discrimination between phones without being based on discrimination between states within a single phone.

7. The method according to claim 6 wherein each phone has a first state, a middle state and a last state, wherein said first state is constrained only by a predecessor context and said last state is constrained only by a following context.

8. The method according to claim 3, wherein said determining step includes scaling said posterior probabilities of phone classes to convert the activation levels of the output units from smoothed context-dependent posterior probabilities to smoothed context-dependent scaled observation likelihoods.

9. The method according to claim 8, wherein the scaling is according to the following relationship:

$$p(Y|q_j,c_k) = p(q_j|Y,c_k) * K^k_j,$$

where $K^k_j$ is the scaling factor for class $q_j$ given context $c_k$,
$p(q_j|Y,c_k)$ is the context-dependent posterior probability of class $q_j$, given speech vector Y and context $c_k$, and
$p(Y|q_j,c_k)$ is the observation likelihood of speech vector Y given class $q_j$ and context $c_k$.

10. The method according to claim 9, wherein the scaling factor $K^k_j$ from said posterior probabilities to said observation likelihoods is given by:

$$K^k_j = \alpha^k_j/p(q_j) + (1-\alpha^k_j) * p(c_k|Y)/(p(q_j|c_k)*p(c_k)).$$

where:

$$\alpha^k_j = N_{ci}(j)/(N_{ci}(j) + b*(N_{cd}(j,k))),$$

$p(q_j)$ being the prior probability of the phone class $q_j$ computed by counting in the training set,
$p(c_k|Y)$ being the posterior probability of context class $c_k$ given the input speech vector Y,
$p(q_j|c_k)$ being the conditional probability of phone class $q_j$ given the context $c_k$ computed by counting in the training set,
$p(c_k)$ being the prior probability of the context class $c_k$ computed by counting in the training set,
$N_{ci}(j)$ being the number of examples of phone class $q_j$,
$N_{cd}(j,k)$ being the number of examples of phone class $q_j$ given the context $c_k$, and
b being a constant optimized on an independent development set.

11. A speech recognition apparatus comprising:
a hidden Markov model speech recognizer means;
a multilayer perceptron means (MLP), said MLP comprising:
a single input layer for receiving a plurality of input speech vectors from a source of speech vectors, a single hidden layer, a single set of weights between said input layer and said hidden layer, and a plurality of output layers with an associated plurality of sets of weights between said hidden layer and said output layers, each one of said output layers having a plurality of output units for storing a plurality of probability values; and
means for forward propagating each input speech vector through said multilayer perceptron means to produce an activation level representative of a probability value at each output unit within each one of said output layers;
means coupled to said MLP for determining likelihood of observing each speech vector assuming a specific state of a hidden Markov model by factoring, according to Bayes rule, said likelihood of observing being in terms of posterior probabilities of phone classes of the speech vector assuming context and the input speech vector, thereby obtaining values representative of context-dependent estimation; and
wherein said hidden Markov model speech recognizer means employs said values representative of context-dependent estimation as state-dependent observation probabilities to identify a specific estimated word sequence from said input speech vectors, for recognizing speech by context-dependent estimation of a plurality of state-dependent observation probability distributions of phone classes which has weights that have been obtained based on a training set of speech vectors.

12. The apparatus according to claim 11 wherein said determining means comprises means for factoring according to Bayes rule given by:

$$p(Y|q_j,c_k) = \frac{p(q_j|Y,c_k) * p(Y|c_k)}{p(q_j|c_k)},$$

where $p(Y|c_k)$ can be factored as $$p(Y|c_k) = p(c_k|Y)*p(Y)/p(c_k)$$

where
p(Y) is the probability of speech vector Y (which is a term which can be disregarded in the computation, as it will be identical for all recognition paths being compared),
$p(c_k)$ is the prior probability of the context class $c_k$ computed by counting in the training set,
$p(Y|c_k)$ is the conditional probability of the speech vector Y given context $c_k$,
$p(c_k|Y)$ is the conditional probability of the context $c_k$ given the speech vector Y,
$p(q_j|Y,c_k)$ is the context-dependent posterior probability of class j, given speech vector Y and context k,
$p(Y|q_j,c_k)$ is the observation likelihood of speech vector Y given class $q_j$ and context $c_k$,
$p(q_j|c_k)$ is the conditional probability of the class $q_j$ given context $c_k$.

13. The apparatus according to claim 11 further including means for training said multilayer perceptron to optimize said weights to smoothed values, said smoothed values being intermediate of context-independent posterior probability distributions and context-dependent posterior probability distributions using a cross-validation set.

14. The apparatus according to claim 13 wherein said training means comprises:
means for initializing input-to-hidden layer weights of said multilayer perceptron with input-to-hidden layer weights from a corresponding context-independent network;
means for initializing each set of context specific hidden-to-output layer weights of said multilayer perceptron with hidden-to-output layer weights from a corresponding context-independent network; and
means for applying the iterative Backpropagation Algorithm with relative entropy criterion to said context-dependent network by presenting training examples from a training set to said input layer, forward propagating values representing activations only to that context-specific output layer corresponding to the context of the input speech vector, and backpropagating and adjusting only those hidden-to-output layer weights corresponding to the context of the input speech vector until said cross-validation set indicates a localized minimum error of classification of speech vectors into phonetic classes.

15. The apparatus according to claim 13 wherein states of the hidden Markov model directly correspond to units of separate output layers associated with the separate states of each phone, wherein said employing means further comprises means for stepping through a sequence for each individual phone while referencing different output layers, said different output layers being organized as a sequence.

16. The apparatus according to claim 15 wherein said separate output layers are trained only with input speech vectors in the training set which are aligned with the corresponding state position within a phone so that a sequence of probabilities can be used to represent a phone and that the training of the MLP can be based on discrimination between phones without being based on discrimination between states within a single phone.

17. The apparatus according to claim 16 wherein each phone has a first state, a middle state and a last state, wherein said first state is constrained only by a predecessor context and said last state is constrained only by a following context.

18. The apparatus according to claim 13, wherein said determining means includes means for scaling said posterior probabilities of phone classes to convert the activation levels of the output units from smoothed context-dependent posterior probabilities to smoothed context-dependent observation likelihoods.

19. The apparatus according to claim 18, wherein the scaling is according to the following relationship:

$$p(Y|q_j,c_k) = p(q_j|Y,c_k) * K^k_j,$$

where
- $K^k_j$ is the scaling factor for class $q_j$ given context $c_k$,
- $p(q_j|Y,c_k)$ is the context-dependent posterior probability of class $q_j$ given speech vector Y and context $c_k$, and
- $p(Y|q_j,c_k)$ is the observation likelihood of speech vector Y given class $q_j$ and context $c_k$.

20. The apparatus according to claim 19, wherein the scaling factor $K^k_j$ from said posterior probabilities to said observation likelihoods is given by:

$$K^k_j = \alpha^k_j/p(q_j) + (1-\alpha^k_j) * p(c_k|Y)/(p(q_j|c_k)*p(c_k)),$$

where:

$$\alpha^k_j = N_{ci}(j)/(N_{ci}(j) + b*(N_{cd}(j,k))).$$

- $p(q_j)$ being the prior probability of the phone class $q_j$ computed by counting in the training set,
- $p(c_k|Y)$ being the posterior probability of context class $c_k$ the input speech vector Y,
- $p(q_j|c_k)$ being the conditional probability of phone class $q_j$ given the context $c_k$ computed by counting in the training set,
- $p(c_k)$ being the prior probability of the context class $c_k$ computed by counting in the training set,
- $N_{ci}(j)$ being the number of examples of phone class $q_j$,
- $N_{cd}(j,k)$ being the number of examples of phone class $q_j$ given the context $c_k$, and
- b being a constant optimized on an independent development set.

* * * * *